US007410422B2

(12) United States Patent
Fine

(10) Patent No.: US 7,410,422 B2
(45) Date of Patent: Aug. 12, 2008

(54) UNIFIED PLAYER REWARDS

(75) Inventor: Randall A Fine, Las Vegas, NV (US)

(73) Assignee: Harrah's Operating Company, Inc., Las Vegas, NV (US)

(*) Notice: Subject to any disclaimer, the term of this patent is extended or adjusted under 35 U.S.C. 154(b) by 681 days.

(21) Appl. No.: 10/462,018

(22) Filed: Jun. 13, 2003

(65) Prior Publication Data

US 2004/0254010 A1 Dec. 16, 2004

(51) Int. Cl.
*G06F 17/00* (2006.01)

(52) U.S. Cl. ........................................................ 463/42

(58) Field of Classification Search ............. 463/39–42, 463/16–20, 14, 15; 709/223–226
See application file for complete search history.

(56) References Cited

U.S. PATENT DOCUMENTS

| | | | |
|---|---|---|---|
| 4,531,187 | A | 7/1985 | Uhland |
| 4,755,941 | A | 7/1988 | Bacchi |
| 4,910,677 | A | 3/1990 | Remedio |
| 5,007,641 | A | 4/1991 | Seidman |
| 5,080,364 | A | 1/1992 | Seidman |
| 5,129,652 | A | 7/1992 | Wilkinson |
| 5,179,517 | A | 1/1993 | Sarbin et al. |
| 5,255,184 | A | 10/1993 | Hornick et al. |
| 5,257,179 | A | 10/1993 | DeMar |
| 5,265,874 | A | 11/1993 | Dickinson et al. |
| 5,270,921 | A | 12/1993 | Hornick |
| 5,283,733 | A | 2/1994 | Colley |
| 5,287,269 | A | 2/1994 | Dorrough et al. |
| 5,321,241 | A | 6/1994 | Craine |
| 5,326,104 | A | 7/1994 | Pease et al. |
| 5,429,361 | A | 7/1995 | Raven et al. |
| 5,470,079 | A | 11/1995 | LeStrange et al. |
| 5,613,912 | A | 3/1997 | Slater |
| 5,639,088 | A | 6/1997 | Schneider et al. |
| 5,655,961 | A | 8/1997 | Acres et al. |
| 5,722,893 | A | 3/1998 | Hill et al. |
| 5,761,647 | A | 6/1998 | Boushy |

(Continued)

FOREIGN PATENT DOCUMENTS

EP 0649109 A1 4/1995

(Continued)

OTHER PUBLICATIONS

Belobaba, P. P., *Application of a Probabilistic Decision Model to Airline Seat Inventory Control,* Operations Research, vol. 37, No. 2, pp. 183-197, Mar.-Apr. 1989.

(Continued)

*Primary Examiner*—Ronald Laneau
(74) *Attorney, Agent, or Firm*—Fenwick & West LLP

(57) ABSTRACT

In a casino enterprise, players earn reward credits from their betting activity at gaming machines, tables and devices. Base credits are earned by players at a fixed rate according to their coin-in; bonus credits are earned at a variable rate as a function of their worth as players to the casino or the property at which they are gaming. Preferably the fixed credit rate is published to the players while the variable rate(s) are not disclosed. The earned credits are combined for the player into a single account balance, from which the player can redeem credits for comps.

26 Claims, 3 Drawing Sheets

U.S. PATENT DOCUMENTS

| | | | | |
|---|---|---|---|---|
| 5,762,552 | A | 6/1998 | Vyong et al. | |
| 5,766,075 | A | 6/1998 | Cook et al. | |
| 5,770,533 | A | 6/1998 | Franchi | |
| 5,779,549 | A | 7/1998 | Walker et al. | |
| 5,800,269 | A | 9/1998 | Holch et al. | |
| 5,809,482 | A | 9/1998 | Strisower | |
| 5,811,772 | A | 9/1998 | Lucero | |
| 5,813,912 | A | 9/1998 | Shultz | |
| 5,851,149 | A | 12/1998 | Xidos et al. | |
| 5,918,209 | A | 6/1999 | Campbell et al. | |
| 6,003,013 | A | 12/1999 | Boushy | |
| 6,049,774 | A | 4/2000 | Roy | |
| 6,183,362 | B1 | 2/2001 | Boushy | |
| 6,253,187 | B1 | 6/2001 | Fox | |
| 6,263,315 | B1 | 7/2001 | Talluri | |
| 6,267,671 | B1 | 7/2001 | Hogan | |
| 6,424,949 | B1 | 7/2002 | Deaton et al. | |
| 6,511,377 | B1 | 1/2003 | Weiss | |
| 6,554,705 | B1 | 4/2003 | Cumbers | |
| 2002/0028706 | A1* | 3/2002 | Barnard et al. | 463/26 |
| 2003/0137110 | A1* | 7/2003 | Huard et al. | 273/292 |
| 2003/0162577 | A1* | 8/2003 | Hamud | 463/13 |
| 2003/0232651 | A1* | 12/2003 | Huard et al. | 463/42 |
| 2006/0205461 | A1* | 9/2006 | LaRocca et al. | 463/1 |
| 2006/0281540 | A1* | 12/2006 | Rush et al. | 463/25 |

FOREIGN PATENT DOCUMENTS

| | | |
|---|---|---|
| JP | 404077958 | 3/1992 |
| WO | WO95/03570 | 2/1995 |
| WO | WO95/30944 | 11/1995 |

OTHER PUBLICATIONS

Bitran, G. R. and Mondschein S. V., *An Application of Yield Management to the Hotel Industry Considering Multiple Day Stays,* Operations Research, vol. 43, No. 3, pp. 427-443, May-Jun. 1995.

Brumelle, S. L., McGill, J. I., *Airline Seat Allocation with Multiple Nested Fare Classes,* Operations Research, Operations Research Society of America, vol. 41, No. 1, pp. 127-137, Jan.-Feb. 1993.

Brumelle, S. L., McGill, J. I., Oum, T. H., Sawaki, K., and Tretheway, M. W., *Allocation of Airline Seats Between Stochastically Dependent Demands,* Transportation Science, Operations Research Society of America, vol. 24, No. 3, pp. 183-192, Aug. 1990.

Burns, B et al.: *Beware the Sirens,* Gamboling and Gambling in Las Vegas, Noble House, Ch.2 pp. 9-11, 18-19.

Chapman, S. N., and Carmel, J. I., *Demand/Capacity Management in Health Care: An Application of Yield Management,* Health Care Management Review, vol. 17, No. 4, pp. 45-54, Fall 1992.

Curry, R. E., *Optimal Airline Seat Allocation with Fare Classes Nested by Origins and Destinations,* Aeronomics Incorporated, pp. 1-22, Jun. 1989.

Curry, R. E., *Real-Time Revenue Management,* Technical Brief, Aeronomics Incorporated, pp. 1-4, Second Quarter 1992.

Donaghy, K., McMahon, U., and McDowell, D., *Yield Management: an Overview,* InternaA13tional Journal of Hospitality Management, vol. 14, No. 2, pp. 139-150, 1995.

Dunn, K. D., and Brooks, D. E., *Profit Analysis: Beyond Yield Management,* The Cornell HA16otell and Restaurant Administration Quarterly, vol. 31, No. 3, pp. 80-90, NovemA17ber, 1990.

*Even the Low Rollers Should Play comp Card,* Chicago Sun-Times, Weekend Plus, Gaming, p. 15, Aug. 5, 1994.

Freedman, David H., *Odds Man In,* Forbes, pp. 33-35, Oct. 25, 1993.

*Going for Broke—Casino Hotels Lure $100,000 Gamblers with Extravagant Suites,* Arizona Republic/Phoenix Gazette Newspaper article, Monday Mar. 2, 1987.

Grossmam, L: *You Can Bet On It—How To Get Maximum Value For Your Gambling Dollar!,* Casino Games vol. 1, Ch.8, pp. 65-69.

Hanks, R. D., Cross, R. G., and Noland, R. P., *Discounting in the Hotel Industry: A New Approach,* The Cornell Hotel and Restaurant Administration Quarterly, vol. 33, No. 1, pp. 15-23, Feb. 1992.

*Harrah's Casino's Introduces Two 'Firsts' For The Casino Industry,* PR Newswire, Aug. 23, 1993.

*Harrah's Toll-Free Res Line Links Six Properties,* Travel Weekly, vol. 52, No. 82, p. 67, Oct. 18, 1993.

Harris, F. H. and Peacock, P., *Hold My Place, Please, Yield Management Improves Capacity-Allocation Guesswork,* Marketing Management, vol. 4, No. 2., pp. 34-46, Fall 1995.

*Introducing the Next Logical Step in Player Tracking,* PRC Gaming Systems, PitTrak Brochure.

Jauncey, S., Mitchell, I., and Slamet, P., *The Meaning and Management of Yield in Hotels,* International Journal of Contemporary Hospitality Management, vol. 7, No. 4, pp. 23-26, 1995.

Kaberline, Brain, *Casinos Hope Gamblers Play Their Cards Right,* Kansas City Buisness Journal, vol. 13, No. 1, Sec. 1, p. 1, May 5, 1995.

Kilby, J. et al: *Casino Operations Management,* Elements of an Effective Player Rating System, Wiley & Sons, pp. 198-199.

Kimes, S. E., *Yield Management: A Tool for Capacity—Constrained Service Firms,* Journal of Operations Management, vol. 8, No. 4, pp. 348-363, Oct. 1989.

Kuyumcu, A. H., *Gaming with Revenue Management,* Talus Solutions, Inc., Scorecard Growth Strategies for the Information Age, Technical Brief, pp. 1-8, Summer, 2000.

Lieberman, W. H., *Debunking the Myths of Yield Management* [online] [Retrieved on May 15, 2001.] Retreived from the Internet: <URL: www.abovetheweather.com/ym_myths.pdf>. (First appeared in The Cornell H.R.A. Quarterly, pp. 34-41, Feb. 1993).

Musgrave, G., *Entertainment Industry Economics: A Guide for Financial Analysis,* Buisness Economics, vol. 33, No. 3, pp. 68-69 (Jul. 1998).

Musgrave, G., *Entertainment Industry Economics: A Guide for Financail Analysis,* Buisness Economics, vol. 33, No. 3, pp. 68-69 (Jul. 1998).

Orkin, E. B., *Boosting Your Bottom Line with Yield Management,* The Cornell Hotel and Restaurant Administration Quarterly, vol. 28, No. 4, pp. 52-56, Feb. 1988.

Orkin, E. B., *Strategies for Managing Transient Rates,* The Cornell Hotel and ReA31staurant Administration Quarterly, vol. 30, No. 4, pp. 34-39, Feb. 1990.

Provost, G: *High Stakes—Inside the New Las Vegas* ,The Arena, Truman Talley Books; Ch 8, pp. 65-69.

Relihan III, W. J., *The Yield-Management Approach to Hotel-Room Pricing,* The Cornell Hotel and Restaurant Administration Quarterly, vol. 30, No. 1, pp. 40-45, May 1989.

Renneisen, R.: *How To Be Treated Like a High Roller:. Even Though You're Not One, Making Casino Visits More Fun and More Profitable,* Player Ratings, Fleas, Whales and other Casino Life Forms, Carol Publishing, pp. 65-69.

Rubin, M: *Comp City—A Guide To Free Las Vegas Vacations,* Evolution of Comps Ch. 1 pp. 12-17, Today's Comp System—Ratings, Formulas, Equivalencies, pp. 21-25, Huntington Press.

Tracy, M: *The Casino Management Handbook—A Pratical Guide for Increasing Casino Profits,* Formulas and Definitions, Preston Publishing, Ch. 2, pp. 43-58.

Vinod, B., *Reservation Inventory Control Techniques to Maximize Revenues,* The Third International Airline Yield Management Conference, Dec. 3, 1990.

Weatherford, L. R., *Using Prices More Realistically as Decision Variables in Perishable-Asset Revenue Management Problems,* Abstract. Journal of Combinatorial Optimization [online]. Oct. 1997, 1(3):277-304. [retrieved on May 15, 2001]. Retrieved from the Internet: <URL: http://www.wkap.nl/oasis.htm/144927>.

Wolff, P: *Lifestyles of a High Roller,* Las Vegas, Ch 1pp. 8-9; The Islands, Ch 2, pp. 76-77; Atlantic City, Ch 3, pp. 116-134, Gollehon.

Wollmer, R. D., *An Airline Seat Management Model for a Sinlge Leg Route When Lower Fare Classes Book First,* Operations Research, vol. 40, No. 1, pp. 26-37, Jan.-Feb. 1992.

Zidenberg, A: *Casino Management for the 90s,* Marketing Strategies—Defying the Odds, Kendall Novel Publishing, Ch 15 pp. 380-383.

Zimmerman, N: *Casino Management for the 90s,* Marketing Strategies—Defying the Odds, Kendall Novel Publishing, pp. 376-379.

Slot-Machine-Games.Net: *Las Vegas Slot Clubs News,* Las Vegas Review-Journal, Jan. 11, 2002, 2 pages.

One Club, One Card Mandalay Resorts debuts The One Club: strictlyslots.com Mar. 28, 2003, 6 pages.

Slot Clubs: VideoPokerReview.com May 21, 2003, 2 pages.

Player's Edge: MGM Mirage slowly breaks in Players Club: lasvegas.com, Apr. 26, 2002.

Player's Edge: Three casinos form new players club: lasvegas.com, Jan. 31, 2003, 3 pages.

Player's Edge: Arizona Charlie's continues popular promotion: lasvegas.com, Mar. 7, 2003, 3 pages.

Player's Edge: Station Casinos up ante in free play promotion: lasvegas.com Mar. 28, 2003, 3 pages.

Evaluating Station's Boarding Pass: CasinoGaming.com, Dec. 17, 2002, 3 pages.

PCT International Search Report and Written Opinion for International Application No. PCT/US04/18947 dated Feb. 28, 2005 (5 pages).

* cited by examiner

UNIFIED PLAYER REWARDS

FIELD OF THE INVENTION

The present invention relates to system and method for rewarding players for gaming at casino establishments, and more particularly to rewarding players in a unified framework accounting for both coin-in behavior and customer value.

BACKGROUND OF THE INVENTION

Casinos have treated important players with free or reduced cost goods and services for many years. Until the early 1990's determining which players were "high rollers" who were worth giving "comps" to, was essentially ad hoc and entirely up the judgment of the casino manager, without any significant element of technological support. As a result, comping was typically limited to players of table games (e.g., blackjack, crap, baccarat), where the player's betting could be observed by a table or pit boss, who "rated" the player, based on the boss's estimate of the amount of time the player gambled and their average bet. Slot tracking programs then developed in the late 1980's offered the capability to track player betting in slot machines, enabling the casino to more precisely determine how much a particular player had gambled in a particular period of time on one or more slot machines. The first of these slot clubs were limited to operating at individual casinos. As a result, the casinos became more able to comp slot players who were valuable to the casino, and not merely high roller table players. In 1996 Harrah's Entertainment introduced the first player tracking club that operated at multiple properties and nationwide. This allowed its casinos to capture the betting behavior of any player at any of its multiple casinos, and thereby base decisions on whether and how much to comp such a player according to their overall level of betting across the multiple casinos. Multiple property player tracking clubs for tracking slot play are just now becoming more common with the introduction of several such multiple property clubs in the past several years.

Given the computer and networking infrastructure used to support a player tracking program, the casino must decide how to reward players who participate in the player tracking program. Each casino typically uses a different combination of comps and incentives that it believes most appropriately rewards such players for their gaming activity. One such program gives players rewards players by granting credits (called "points") that can be redeemed for cash or cash equivalents. Significantly, the credits are earned at a fixed rate, and this rate is published to the players. Thus, players earn four "points" for each dollar that they bet. Points are accumulated over time, and then can be redeemed by the player for free meals, room, and entertainment. Because the rate (or schedule) at which points are earned is published to the players, players can readily determine how many points they will earn from their betting during particular gaming session or from any other activity for which points are rewarded. The problem with this approach is that it prevents the casino property from individually differentially comping players based on their value to the casino. In other words, with a fixed rate schedule, every player earns points in the same way, at the same rate, for the same activities. Both the "high roller" who bets thousands of dollars an hour, and the nickel slot player earn points and comps at the same rate, even though the high roller is worth more to casino. This fixed and published schedule for earning points thus fails to adequately differentiate players based on their value to the casino.

Other casinos attempt to overcome this problem by using a comp system that is not published. Instead, the casino maintains in secret the formulas or rates used to award comp to the players based on their gaming and other activities. This does allow the casino to treat players more individually by rewarding different players at different rates or with different comps. However, it also makes it impossible for individual players to know with certainty that they are earning comps, since it appears that the casino acts entirely at its own discretion. Even where players know that the more they bet the more they are comped, this level of knowledge is not sufficient for players to specifically understand the relationship between their gaming behavior and the amount of points or credits that the are earning.

Finally, even when a casino has provided both points and comps, the mechanisms by which points and comps were earned were kept entirely separate. Thus, players would earn points in an account based on certain aspects of their betting behavior, and may have separately earned comps, but there was no relationship between the two forms of incentives in terms of how they were earned, accounted for, or redeemed.

SUMMARY OF THE INVENTION

The present invention overcomes the limitations of existing player tracking programs by providing a unified framework in which a player earns credits (also called "reward credits") from their betting activity and such credits are earned on both a fixed rate schedule for certain aspects of player betting, and on a variable schedule based on the value of the customer to the casino. Preferably the fixed rate schedule is published and made known to the players, thereby enabling such players to determine the number of credits they will earn for each dollar of betting or selected activity; the variable schedule is not published, and this enables the casino to differentially reward credits to customers at one or more rates based on the customer, the property, or any desired promotional event. The combination of a fixed rate schedule and a variable rate schedule provides the casino with a highly flexible reward system.

Further, in a preferred embodiment, the credits offered on a fixed schedule are earned at a fixed rate regardless of the property at which the player is betting. The credits earned from the variable schedule are earned using rates that can be specific to individual casino properties in a multi-property enterprise. The credits in this system preferably have a predetermined accounting value that enables each property in the multiple property system to award credits to the player's account and to redeem credits in the player's account, even if that player has a different customer value to each property, and thereby earn credits at different rates in the various casinos.

In one embodiment, players are awarded base credits and bonus credits, which are stored in an account. A player tracking system is used to track the players' betting activity at various gaming devices in one or more casinos. Base credits are awarded to a player by applying a base credit rate to the player's bets; for example the base rate may be five credits for every dollar bet by the player. Preferably the base credit rate is fixed such that it applies to all of the player's betting activity within a given casino, and between different casino properties in a multi-property casino enterprise. Further, the base credit rate is published to the players so that players know exactly how many base credits they can and do earn for the amount of money they bet. Bonus credits are also awarded to the player and stored in the player's account with the base credits. The bonus credits are awarded by applying a bonus credit rate to a measurement of the player's value to the casino over a selected period of time. The bonus credit rate varies according to the property at which the player is current betting (where there are multiple properties), according to the value of the player to the casino, according to the game the player is betting at, or according to any combination of these factors. For example, the player may have a value of $100 on a given day as a function of the particular games the player is playing. One casino property may apply a bonus credit rate of 10% to this amount to award the player ten bonus credits. Another property may apply a bonus rate of 15% to this same player's value, and thereby award fifteen bonus credits. This enables each property to individually comp the player as it best sees fit.

A system in accordance with the present invention includes a plurality of gaming machines at which player's engage in betting activity, a slot management system which monitors the players' betting activity, and casino management system which receives betting activity data from the slot management system indicating for a player the amount of coin-in by the player, and the information from which a player's theoretical win during a gaming session can be determined. The casino management system determines for the player a number of base reward credits earned by applying a base credit rate to the player's coin-in amount. The casino management system also determines a number of bonus credits earned by applying a bonus credit rate to a measure of the player's worth, as a function of the theoretical win. The bonus credit rate increases as the player's worth increases, thereby increasing the overall rate at which bonus credits are earned. The bonus and base credits are totaled for the player and available to be redeemed by the player for comps. The system is extensible to a plurality of casino properties, such that each property can use its own bonus rate schedule.

The features and advantages described in this summary and the following detailed description are not all-inclusive. Many additional features and advantages will be apparent to one of ordinary skill in the art in view of the drawings, specification, and claims hereof. Moreover, it should be noted that the language used in this disclosure has been principally selected for readability and instructional purposes, and may not have been selected to delineate or circumscribe the inventive subject matter, resort to the claims being necessary to determine such inventive subject matter.

FIGS. **2*a* and 2*b*** are a interaction diagram of the operation of the system.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

System Architecture

Figure 1:
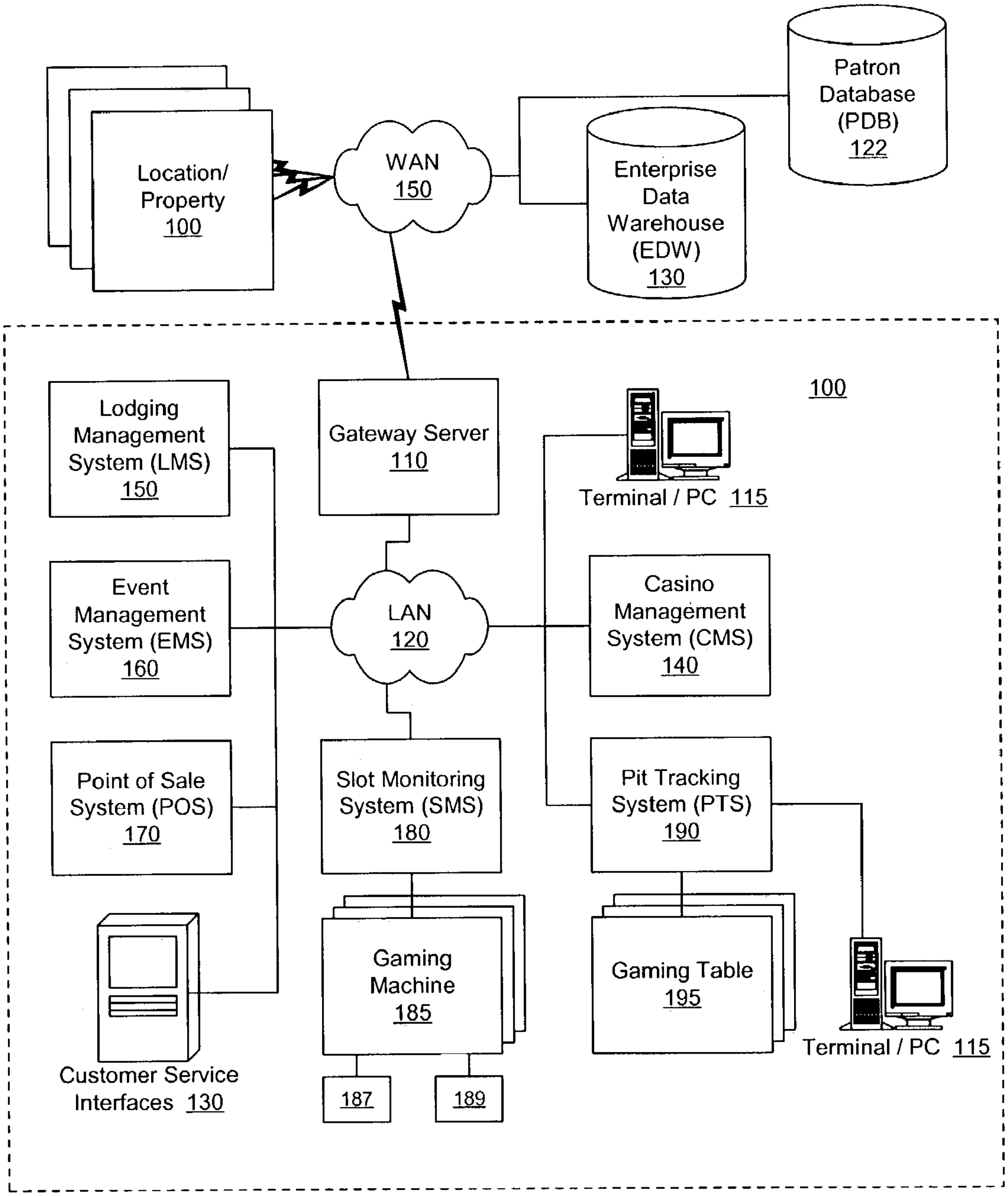
FIG. 1 is a schematic diagram of an embodiment of a system for practicing the present invention.

FIG. 1 is a block diagram of an embodiment of the system for practicing the present invention at the property or property level. A property 100 will typically be a casino or other gaming establishment. A property 100 includes a gateway server 110 for coupling a local network 120 (such as a LAN) to a wide area network (WAN) 150. This allows multiple properties 100 to share and exchange data. In addition, the property 100 preferably includes one or more local operator terminals (such as a PC or a dumb terminal) 125 coupled to the LAN 120, allowing the casino personnel to access the system from the property 100. Having an operator terminal 125 at each property 100 allows local casino employees to manage the reward credit system at the property level, in real-time, and in response to player or casino needs.

In one embodiment, the gateway server 110 includes an API for sending data pertaining to local player activity over the WAN 150 to other properties or to a central data warehouse, such as the enterprise data warehouse (EDW) 130 and a patron database 122. The gateway server 110 communicates with several computer systems for monitoring and tracking operations at the particular property 100.

The PDB 122 is adapted to provide the system with data regarding individual players, or players in a casino context. The PDB 122 preferably includes player accounts for players from all of the supported enterprise properties 100. The PDB 122 can be either a centralized database, or a distributed or federated database, with segments of the database located at various properties 100. In one embodiment, each player account in the PDB 122 includes detailed information such as the player's personal information, preferences, interests, gaming and lodging history, credit rating, comp level, customer value measures, and accumulated credits. A player's customer value measure is a measure of the player's value to the casino based on the player's betting activity, and optionally based on other activities of the player from which the casino derives revenue or value. In a preferred embodiment, the customer value measure is a theoretical win value is determined according to the player's betting activity accumulated at any of the properties affiliated with the enterprise. Credits are also determined by player betting activity, but may also be augmented by other types of activities as well, and by special offers and various other promotional programs. These other activities include but are not limited to making a reservation, staying in a hotel, purchasing an item in a retail environment, eating at a restaurant, and attending a show or other events. In another aspect of an embodiment, PDB 122 is coupled via the WAN 150 to the EDW 230 uploading player activity information for further analysis.

In one embodiment, players are issued tracking cards to interface with the system and thereby allow for tracking of their activities. Each tracking card preferably includes a magnetic strip, microchip, or other mechanism for storing machine-readable data thereon. When a player performs some activity at a property, the player may use the tracking card to interface with the system. For example, in the case of magnetic strip cards, the player inserts the card through into card reader (i.e., "card in"). Specifically for tracking player betting, a slot machine or other gaming machine 185 includes a magnetic stripe card reader (not shown) which is adapted to receive the player tracking cards. The incorporation of card readers into gaming machines 185 is a standard practice and well known to those of skill in the art. In an alternate or additional method of tracking player activity, the player or enterprise personnel can manually enter a player ID number into a terminal coupled to the system.

Depending on the services offered at a property 100, any combination of the following systems might be used to gather player activity data: a Casino Management System (CMS) 140, a Lodging Management System (LMS) 150, an Event Management System (EMS) 160, a Point of Sale System (POS) 170, a Slot Monitoring System (SMS) 180, and a Pit Tracking System (PTS) 190. U.S. Pat. No. 5,761,647, "National Customer Recognition System and Method," the contents of which are fully incorporated by reference herein, explains how a CMS 140, a LMS 150, an EMS 160, a POS 170, a SMS 180, and a PTS 190 are used to track players' gaming and non-gaming activity at a plurality of affiliated casino properties communicatively coupled by a WAN. One suitable system for managing some or all of these point-of-sale operations is the 9700 Hospitality Management System (HMS), offered by MICROS Systems, Inc. The 9700 HMS is specifically designed to handle high usage, multiple revenue center environments, and it enables flexibility in the development of custom point of sale applications.

The CMS 140 is responsible for overall management of the tracking of player activity, and the determination of reward credits to be given to each player based on such activity. The CMS 140 receives data describing a player's activity from the various other systems, as further described below, makes the appropriate calculations for earned reward credits, and updates the player's account in the PDB 122.

The SMS 180 comprises a computer system that monitors and tracks bets made by players at the various gaming machines 185 at the property 100. Gaming machines 185 may include slot machines, video poker machines, or the like. In a preferred embodiment, bet tracking is accomplished through a card reader 189 associated with a gaming machine 185. A player inserts his tracking card in the card reader 189 to initiate bet tracking and removes it to terminate bet tracking. In one embodiment, a player's betting activity at a gaming machine 185 accumulates in the SMS 180 until the gaming session is terminated at which time the data is transferred to the CMS 140 or when the CMS 140 requests an account status. Bet tracking data accumulated by the SMS 180 includes the identification of the games played, the amount of coin-in, the number of credits won, the number of credits played, the amount won or lost, and the time period that the player played the game. U.S. Pat. No. 5,429,361, the contents of which are fully incorporated by reference herein, describes a system for tracking the betting activity of casino players at gaming machines. In one embodiment, the SMS 180 comprises the Slot Data System (SDS), a data collection system for slot accounting and player tracking produced by Bally's Gaming and Systems.

Each gaming machine 185 also includes a countdown meter 187. The countdown meter 187 displays the number of base credits earned by the player during the current gaming session at the gaming machine 185. Preferably, the countdown meter 187 also displays the amount of coin-in that the player needs to play to earn a single base credit. This display occurs in real time (e.g., the amount of coin-in counts downs, and then resets), although the actual earning and posting of base credits to the player's account occurs on CMS 140 after the player removes his card from the card reader 189. The gaming machine 185 has either software or an EEPROM which it uses to manage the countdown meter and calculate the countdown and base earning amounts.

The PTS 190 is used to track player betting at gaming tables 195. The PTS 190 is supported on a computer system that transmits player betting data to the CMS 140. In one embodiment, the PTS 190 uses card readers 189 associated with players' positions at the gaming tables 195 to track their betting activity. Alternatively, an employee of the enterprise, such as a pit boss, manually enters a player's gaming data into the PTS 190. In one embodiment, data regarding betting activity include a player's time at a gaming table 195 and the table's minimum bet. U.S. Pat. No. 5,613,912, the contents of which are fully incorporated by reference herein, describes a system for automatically tracking the betting activity of casino players at gaming tables. Alternatively, tracking of player betting at gaming tables is provided via a terminal 115 located in the pit near the tables. A player provides her player tracking card to a casino employee (e.g., a pit boss) who swipes the tracking card through a card reader 189 at the terminal 115 to initiate the player's session. The employee can then observe the player's betting, and manually enter this information into the terminal, such as average amount bet, length of play, and so forth. U.S. Pat. No. 5,809,482, and U.S. Pat. No. 5,613,912, both incorporated by referenced herein, describes two different embodiment of a PTS 190 that may be used for tracking table play.

The LMS 150 comprises the software and hardware for managing hotel operations within the casino, including reservations, room service, and other activities associated with hotel operations. In a preferred embodiment, the LMS 150 communicates with the CMS 140 to search locally for selected customer information available on that system. However, LMS 150 may include its own local data store for player data specific to the property 100. The LMS 150 transmits data regarding players' lodging activity to the PDB 120 when players check in and out of a hotel. In an embodiment, a player's lodging data includes the dates that the player stayed at a particular property and the type of rooms. This data may also be updated to a central PDB via the application server 102. In addition, the LMS 150 preferably transmits lodging data upon a request from the application server 102 (via the local gateway server 110). The lodging data includes, for example, the dates that a player stays at a hotel, room service activity, and billing information due to the player's stay in the hotel. In one embodiment, the LMS 150 comprises the Lodging Management System, a data management system for hospitality industries produced by Inter-American Data, Inc.

The EMS 160 comprises software for handling ticketing information, reservations, and sales. The EMS 160 compiles player activity data when players purchase tickets for an event (such as a show at the property), make reservations for an event, and attend the event. The EMS 160 transmits this data to the application server 102 upon a request therefrom (via the local gateway server 110).

The POS 170 comprises accounting software for operating restaurants and retail venues within the property as well as software for transmitting charge information to the other management systems. For example, data relating to meals charged to rooms are transmitted from the POS 170 to the LMS 150, and data relating to redeemed meal comps are transmitted from the POS 170 to the CMS 140. The gateway server 110 receives data relating to player's purchases at a property from the POS 170 and transmits the data to the application server 102. This purchasing data includes, in an embodiment, the items or services purchased, the restaurant or retail venue where purchased, and the purchase amounts.

The property 100 preferably includes one or more customer service interfaces (CSI) 130. In one embodiment, a customer service interface 130 comprises a computer having an output display terminal and a user input, such as a card reader 189 and a touchscreen. Players can access information for their account with a customer service interface 130, e.g., by swiping their cards through the card reader 189. The customer service interface 130 may be housed in a kiosk or other user accessible housing. In one embodiment, the CSI 130 receives player data by way of their tracking cards swiped at customer service interfaces 130 located at various venues throughout the property 100. The CSI 130 transmits the received data to the PDB 120 to determine the identity of the player and any required data in the player's account (such as name, address, and any preferred customer status). In particular, the CSI 130 enables customers to view the reward credit balance, and to issue themselves redeemable "comp" tickets or cash voucher according to a provided menu of comps and their associated number of credits.

Data related to each player's activity at a property 100, as collected by any of the management systems described herein, are communicated to the CMS 140, for analysis and determination of appropriate reward credits. The CMS 140 updates the PDB 122 with the results of such analyses, including updating a player's account by incrementing (or decrementing) the player's reward credit balance. Because each property 100 tracks player betting activity, awards reward credits based on such activity, and updates the PDB 122, the enterprise can reward players based on their overall betting (and other activity) at all of the casino properties. This cross-property nature of the system, in combination with the fixed and variable credit rate schedules, enables the enterprise to reward players with credits based on their overall worth to the enterprise from their overall betting activity, while also allowing individual ones of the properties to reward the player based on property specific factors. To maintain all account data up to date, the data processed by the local management systems are periodically updated to central PDB 122, e.g., in a batch process. In one embodiment, this update synchronizes data between multiple storage properties—i.e., PDB 122 and local stores associated with the CMS 140 at each property 100—to enable enterprise personnel at any property 100 to access the most recent and accurate data. When this configuration is employed with a WAN 150 having limited bandwidth, the data synchronization is preferably done when traffic on WAN 150 is low to minimize interference with other on-line data access transmissions.

The CMS 140 is responsible for receiving player betting data from the SMS 180 and the PTS 190 and determining the appropriate reward credits to be rewarded to the player in response to each gaming session, and updating the PDB 122 with this information. Before describing the runtime operation of the CMS 140 to perform such tasks, the framework for determining reward credits will be described.

Reward Credit Framework

In a preferred embodiment, players earn reward credits for their betting activity based on two types of schedules, a fixed rate schedule and a variable rate schedule. These two schedules correspond to two types of credits, base credits and bonus credits. Base reward credits are earned automatically at gaming machines 185, proportional to the amount of coin-in (bets) made by the player. The rate can be the same for all gaming machines 185, or different rates can be used at different types of gaming machines 185. In one embodiment, a player earns one credit for every $5 of coin-in played at slot machines (both either video slots or reel slots), and one credit for every $10 of coin-in played at video poker machines. Of course, other base credit reward rates may be used. The rate for the base credits is preferably made known to the players, so that they can accurately determine how many reward credits they will earn for a certain amount of overall betting. For example, if a player intends to wager $500 at a slot machine, he knows that he will earn 100 reward credits for such betting activity. This lets the player establish personal goals for earning reward credits, in order to redeem them for comps, such as free meals, room, shows, or other goods and services.

The second type of reward credit is the bonus credit. This type is used to further increase the player's comp earnings based on the player's value to the casino. The bonus reward credit rate is variable, and can be based on the player's worth, the particular casino property, the type of gaming machine, or any combination of these.

In a first embodiment, a player earns bonus credits automatically based on a measure of the player's worth and a bonus credit earning rate. The player's worth is derived from the player's theoretical win, which is an estimate of the amount the player will lose (or the casino will earn) during a period of time. Theoretical win is typically determined using the hold percentage of the gaming machine, and the amount of coin-in by the player (or an estimate of the latter using an average bet and the length of play). In a preferred embodiment, the number of bonus credits is determined as follows:

$$\text{Total Bonus Credits}=[(\text{ADT})\times(R(\text{ADT})*100)]-\text{BC}$$

ADT is accumulated daily theoretical win, and is the current sum of the (coin-in*hold) for all of the gaming sessions that have thus far occurred during the casino day. The casino day can be arbitrarily set, but is preferably from 6:00 am to 6:00 am, or as defined by a particular casino property. Thus, over a 24 hr period the player's ADT increases (as they continuing playing), and so the total number of bonus reward credits the player receives for the casino day increases as well.

R(ADT) is a bonus credit earning rate R that is a function of the player's ADT. This bonus rate is also known as a reinvestment rate, since it reflects a percentage of the player's worth that is reinvested by the casino in providing the player with comps. In a preferred embodiment, bonus credit earning rate is described by the following tables:

TABLE 1

Gaming Machine Bonus Rates

| Accumulated Daily Theo. | Bonus Credit Rate % |
|---|---|
| 0-100 | 10% |
| 101-200 | 15% |
| 201-300 | 20% |
| 300+ | 25% |

TABLE 2

Gaming Table Bonus Rates

| Accumulated Daily Theo | Bonus Credit Rate % |
|---|---|
| 0-100 | 5% |
| 101-200 | 10% |
| 201-300 | 15% |
| 300+ | 20% |

These tables show that as the player's ADT increases during the gaming day, he earns bonus credits at a higher and higher rate. While different rates used between gaming machines 185 and gaming table 195 in one embodiment, in other embodiments, the same rates can be used. As can be seen in the above tables, the earning rates increases in proportion to the increase in the ADT, that is, in proportion to increases in the player's worth to the casino during the casino day.

BC is the number of base credits awarded to the player during the gaming day. By subtracting these from the bonus credit determination, the player is given bonus credits only to the extent that they exceed what he earns directly from his coin in according to the base credit rate.

The varying rates in the bonus rate tables enable the casino to grant more bonus credits to players who play a longer amount of time in the casino relative to those to play more days at the casino. For example, assume there are two different players, both of whom wager intend to wager $4000 at the same slot machine. Also, assume the first player wagers $1000 per day for 4 days, while the second player wagers $4000 on a single day. Both players will earn the same number of base credits, e.g., 800 base credits (4000/5), though the first player earns 200 base credits per day. However, the second player will earn more bonus credits because his ADT will be higher. Specifically, if the slot machine has a hold of 6%, then the first player's ADT each day will be 1000*6% or 60. Using the above formula:

$$\text{Total Bonus Credits}=[(\text{ADT})\times(R(\text{ADT})*100)]-\text{BC}$$

This player's Total Bonus Credits will be: [60×(10%×100)]−200=400. Notice that the bonus rate here is 10%, since the player's ADT is less than 101 (from Table 1).

The second player however has a higher ADT, 4000*6% or 240. As a result, the bonus rate (from Table 1) is 15%, and so he earns total bonus credits as follows: Total Bonus Credits=[240×(15%×100)]−800=1800. Thus, even though the players wagered the same amount, $4000, the second player receives over four times as many bonus credits as the first player.

While this embodiment uses a number of tiers to relate the bonus earning rate to the ADT, in other embodiments, the bonus earning rate can vary more directly (either linearly or non-linearly) according to the ADT. The bonus earning rate, whether in tables or other form, can also vary according to the property at which the player is betting. That is, each property can define its own bonus earn rates according to the amounts it chooses to reinvest in the players. For example, while one property in an enterprise may use the above Tables 1 and 2 for its bonus credit rate, another property may use a different set of tables with higher bonus rates and/or more tiers to provide even more credits to players, such as the following:

TABLE 3

Gaming Machine Bonus Rates

| Accumulated Daily Theo. | Bonus Credit Rate % |
|---|---|
| 0-100 | 5% |
| 101-200 | 17% |
| 201-300 | 20% |
| 301-400 | 27% |
| 400+ | 30% |

TABLE 4

Gaming Table Bonus Rates

| Accumulated Daily Theo | Bonus Credit Rate % |
|---|---|
| 0-100 | 3% |
| 101-200 | 7% |
| 201-300 | 18% |
| 301-400 | 22% |
| 400+ | 25% |

These tables reduce the rates at which lower value players earn bonus credits, but increase the rates at which higher value players earn such credits.

The following example illustrates how a player earns base and bonus credits. Assume further that the following bonus rates are used:

TABLE 5

| ADT | Bonus Rates |
|---|---|
| $0-$100 | 5% |
| $101-$200 | 10% |
| $201-$300 | 15% |

| Session # | A Coin In | B Hold % | C Theo (C = A * B) | D ADT | E Base Reward Credits (E = A/$5) | F Accum. Base RC (F) = Sum (E) | G Bonus Rate for ADT | H Total Bonus RC H = (D * G * 100) − E | I Incremental Bonus Reward Credits I(new) = H(new) − H(old) |
|---|---|---|---|---|---|---|---|---|---|
| 1 | $1000 | 10% | $100 | $100 | $1000/$5 = 200 | 200 | 5 | ($100 * 5 − 200) = 300 | 300 − 0 = 300 |
| 2 | $25 | 10% | $ 2.5 | $103 | $25/$5 = 5 | 205 | 10 | ($103 * 10 − 205) = 825 | 825 − 300 = 525 |
| 3 | $10 | 10% | $1 | $104 | $10/$5 = 2 | 207 | 10 | ($104 * 10 − 207) = 833 | 833 − 825 = 8 |
| 4 | $1000 | 10% | $100 | $204 | $1000/$5 = 200 | 407 | 15 | ($204 * 15 − 407) = 2653 | 2653 − 833 = 1820 |
| 5 | $500 | 10% | $50 | $254 | $500/$5 = 100 | 507 | 15 | ($254 * 15 − 507) = 4317 | 3306 − 1820 = 1486 |

This player engages in five gaming sessions over the course of a casino day. During the first session the coin-in is $1000 on a gaming machine 185 with hold percentage of 10%. Accordingly, the theoretical win for that gaming session is $100 as shown in column C, and that is also the accumulated theoretical win thus far. For this gaming session the player earns 200 base credits, as shown in column E. From Table 5, the bonus rate for the player's ADT is 5%. The bonus credits for this session are 300. Column I shows the incremental bonus reward credit value, which is a useful quantity to see the increase in the bonus credits from each gaming session.

In the second gaming session, the player only bets $25. He earns another 5 base credits, so that his total base credits is now 205. Significantly, his ADT now increases to 103, rounded up, and as a result the applicable bonus rate is now 15%. Accordingly, now his total earned bonus credits are 825, an increase of 525, as shown in columns H and I, respectively.

Thus, betting only an additional $25 yielded a significant increase in the player's bonus credits. Session 3 adds a further 8 bonus credits.

Now in fourth session, the player plays another $1000. This increases to ADT to 204, which places increases the bonus rate to 15% as shown in Table 5. As a result, he now earns a total of 2653 bonus credits, an increase of 1820. Thus, while the amount of coin in was the same in the first and fourth sessions, $1000, the player earned over 5 times as many bonus credits in the fourth session as in the first. Notice further that in the fifth session, while only putting in another $500 of coin in (50% fourth session), he earns another 1486 bonus credits, about 82% of what he earned in the fourth session. As this example and the prior example show, the present invention allows the player to earn substantially increasing bonus credits during the casino day, while still earning base credits at a fixed rate.

In addition to the foregoing base rates for gaming machines, base rates are also assigned to gaming tables 195. In one embodiment, the base and bonus credits are earned at gaming tables 195 according to the player's accumulated daily theoretical win for the gaming tables specifically. For base credits, the base credit rate is a multiple, such as 0, 1, or 2, for every $1 of ADT. For example, if a player's table ADT is $50 and the base credit rate is 2, then the player earns 100 base credits for his table play. The base credit multiple may be enterprise wide, or property specific. For bonus credits for table games, the bonus rate is determined as above in Table 2. Alternatively, in a system where the PTS 190 can directly monitor coin-in or it is estimated by an employee, then a direct fixed rate, such as 5 credits for every $1 of coin in, can be used. Base and bonus credits may also be awarded for other types of games, such as sportsbook, keno, and Class II games like bingo and the like, using the same approach as with table games.

System Operation

Figure 2A:
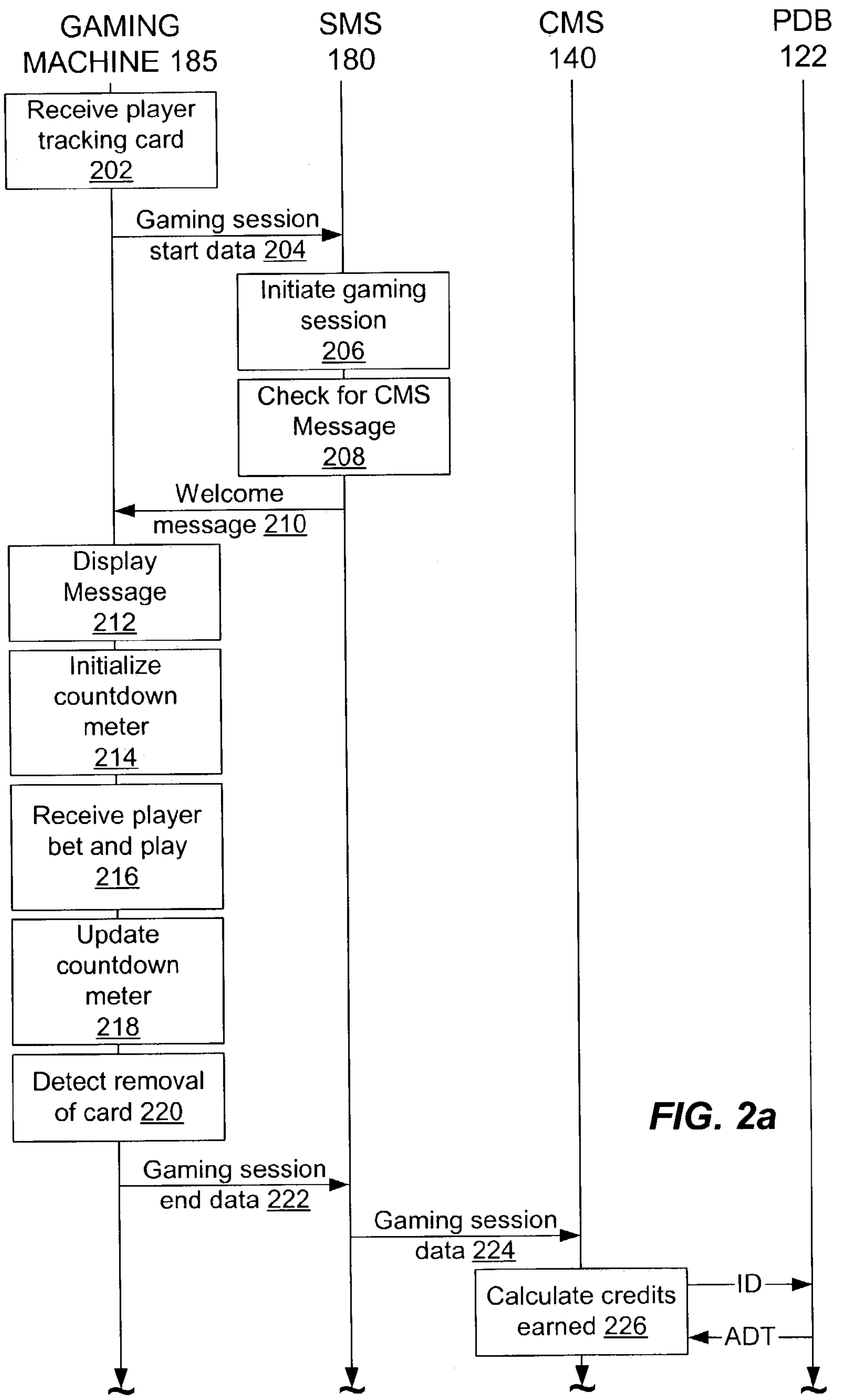
Figure 2B:
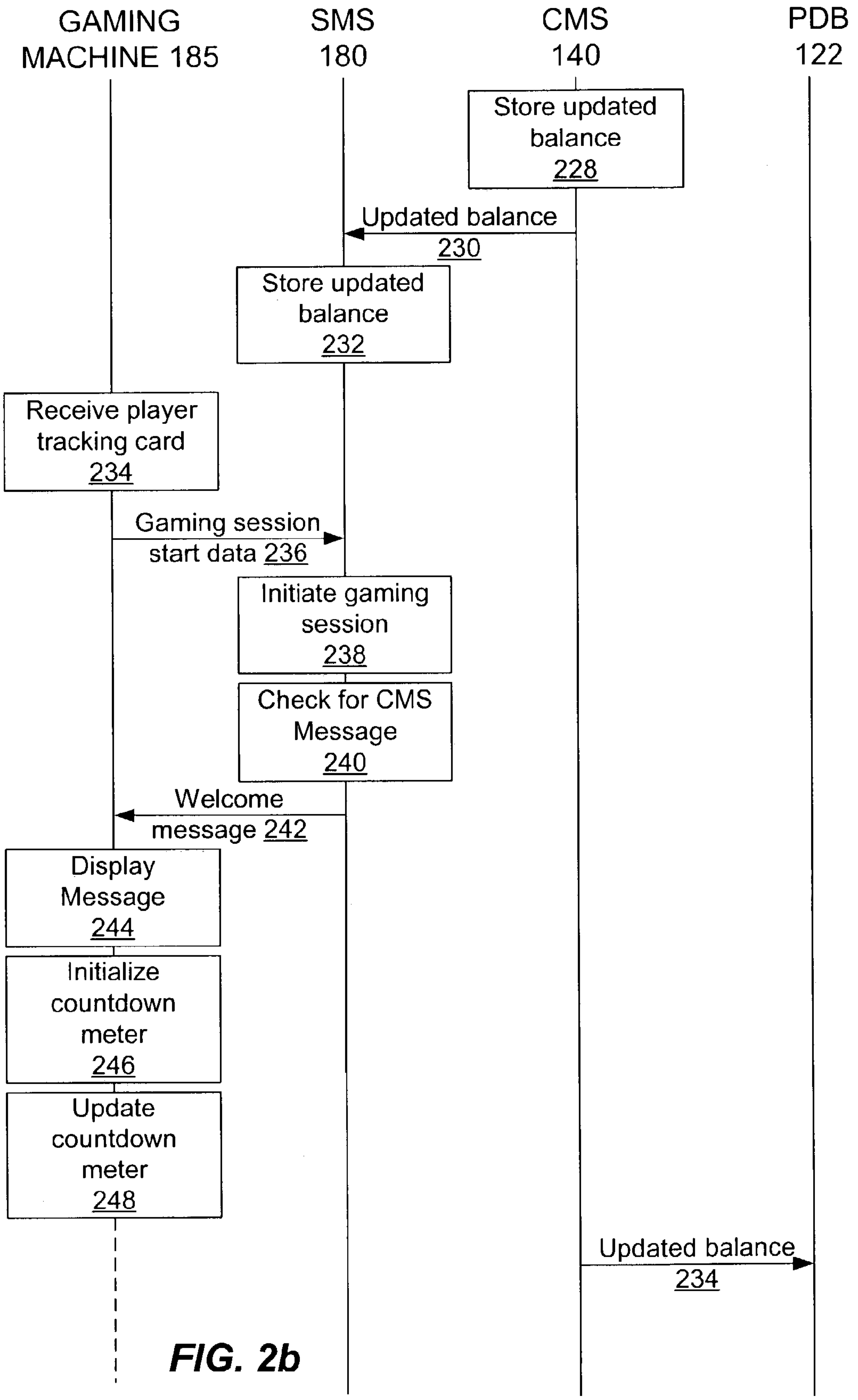

The above framework of credit determination is made by the CMS 140 in conjunction with information it receives from the SMS 180. The CMS 140 stores the appropriate base rate and bonus rate information in accessible memory, along with any other parameters needed to make bonus and base credit calculations. FIG. 2 illustrates the process flow, when considered from the perspective of a given player's activity and the operations of the gaming machine 185, CMS 140, SMS 180, and PDB 122.

The player inserts 202 his player tracking card into the card reader 187 of a gaming machine 185 for the first time during a trip to a casino property. The gaming machine 185 communicates 204 the player's account ID, along with its own machine ID, and time stamp to the SMS 180, which initiates 206 a gaming session for the player. The SMS 180 checks 208 whether it has received a previous message from the CMS 140 with this player's credit balance. Finding none (since it is the first card-in of the trip), the SMS 180 then instructs 210 the gaming machine 185 to display 212 a message on a display panel of the gaming machine 185, such as "Welcome, your Credit Balance will be shown the next time you insert your card." The gaming machine 180 initializes 214 the countdown meter 187, which will display the number of coins required to one base reward credit. For example on a $1 slot machine, where the base rate is 5 base credits for $1, then the countdown meter 187 display is as follows:

| COUNTDOWN | BASE |
|---|---|
| 005 | 0000 |

indicating that the player needs to play $5 to next a credit, and that he has not yet during the session earned any base credits, as would be expected at the time of card in.

During the gaming session, after each play 216, the gaming machine 185 updates 218 the countdown meter 187. Continuing the above example, after the first coin is played, the countdown meter 187 displays:

| COUNTDOWN | BASE |
|---|---|
| 004 | 0000 |

each time decrementing the countdown. When the fifth coin is played, the countdown meter 187 resets the countdown, and increments the base count, such as:

| COUNTDOWN | BASE |
|---|---|
| 005 | 0001 |

The countdown meter 187 will continue to decrement/increment the countdown and base credit counts in this fashion as coins are played.

The gaming session ends when the player removes 220 his player tracking card from the card reader 187. The gaming machine 185 messages 222 the SMS 180 with data indicating the end of the gaming session. The SMS 180 sends 224 a message to the CMS 140 indicating the total amount of coin-in, the total amount won or lost, the time of card-in and card-out, the ID of the gaming machine, the player's card ID, the hold percentage of the machine, and any other information that the casino deems useful. This information is called a "rating."

CMS 140 uses the rating information and calculates 226 the base credits and bonus credits earned from this information. Specifically, the CMS 140 calculates the base credits earned by applying the base credit rate to the total coin-in. The CMS 140 provides the player's ID to the PDB 122 to obtain the player's current ADT. For the first rating of the casino day, this will be 0; as the day progresses, the ADT increases, as shown above. The CMS then calculates the bonus credits earned during the gaming session by first updating the ADT with the theoretical win (coin-in*hold) for the gaming session, and then applying the updated ADT to the total bonus calculation described above, using the updated ADT to determine the appropriate bonus rate. The CMS 140 may also calculate the incremental bonus credits, if so configured.

The CMS 140 preferably maintains a local temporary account for the player, and stores 228 the updated credit balances locally. The CMS 140 sends 230 a message with the updated total (base and bonus) credit balance to the SMS 180. The SMS 180 stores 232 this information locally, for later retrieval.

The next time the player cards-in 234 during the trip, such as later in the same day, the gaming machine 185 as before informs 236 the SMS of the card-in, with the player's ID.

SMS 140 starts 238 another gaming session for the player, and identifies 240 the message from the CMS 140 with the player's ID, and instructs 242 the gaming machine 185 to display 244 the current credit balance on its display panel, along with the player's current tier score (as further described below). The message can also indicate the number of base and bonus credits earned the previous day, or during the current trip. As before, the countdown meter 187 is initialized 246, updated 248, as play continues as shown in FIG. 1. This process repeats upon each card-in and card-out.

The CMS 140 updates 234 the PDB 122 with the player's current credit balances (bonus and base) on a periodic or other basis. This update can follow the close of each gaming day, or after the end of a player's trip, or both. In addition, to ensure that the SMS 180 displays the correct credit balance, the CMS will send a message to the SMS any time there is a change in a player's credit balance, for example due to a manual adjustment by a casino employee.

A player's account stores their earned base and bonus reward credits so that the player may accumulate many credits over a period of time and from multiple casino properties. The enterprise-wide base credit rate, preferably fixed and published to the players, allows all players to know that they will earn a minimum amount of credits no matter which casino they play at, and thus know they can accumulate such base credits consistently across properties. The ability to also earn bonus credits at multiple properties and to combine all such credits into a single credit balance further entices the player and rewards them for playing. A player can access their account balance information either through the display panels on the gaming machines 185, or via the customer service interfaces 130.

In addition to earning and banking reward credits, player may also earn a comp worth score. The comp worth score is preferably the greatest of i), the player's ADT for the past N trips at the current property, ii) the player's ADT of the past N trips to any casino property in the enterprise or iii) the player's ADT for the player's current trip to the casino property, as augmented by the property reinvestment matrix. This comp score is non-bankable in the sense that it must be redeemed for comps (good or services) by the player during the current day or trip.

To facilitate the use of credits across properties of the enterprise, it is preferable to account for the value of the credits in a unified manner. From an accounting perspective, this means that each reward credit is worth a fixed amount, such as $0.01, regardless of the property at which the credit was earned. Different properties thus contribute differing amount of reward credits to a player's balance, thereby making greater or less investments in the player. The differences between such property level investments can be adjusted by cross property payments or other settlements.

The stored credits can be either expiring or non-expiring. Expiring credits expire after a fixed amount of time, or based on some event or condition. For example, to encourage repeated visits by the player, a player's credit balance can be set to expire if the player does not earn at least one reward credit every six months. This can be implemented by storing a date of the last reward credit earned in the player's account in the PDB 122, and performing periodic database updates that check the stored date versus the current date.

In one embodiment, a casino property may offer a voucher or other means for granting a player promotional bonus credits for coming to the property. These reward credits are deposited into the player's account when the player first cards-in into a gaming machine or other device at the casino property, as in step 202 in FIG. 2*a*.

In addition to reward credits earned from betting activity, in some embodiments, additional bonus credits are earned from alternative forms of player activity. One such form is player expenditures with third parties who have affiliate agreements with the enterprise. For example, the enterprise may have an affiliate agreement with a retailer or a credit card company. Each dollar of purchases by the player at the retailer (or dollar of charges on the credit card), are then converted to bonus credits using a conversion rate. To provide such reward credits to the players, the third party updates the enterprise with a data file containing player identification data, and the relevant financial data. The enterprise then calculates the appropriate bonus reward credits for each player, based on the conversion rate.

As mentioned above, players can obtain comps for goods and services at the casino or other locations. Generally, the casino will publish a schedule that lists a variety of goods and services and their corresponding credit cost. For example, a meal at the casino restaurant may be 300 credits, while a free nights stay in the hotel may be 1000 credits, or even a specified amount of cash. To be issued comps, the player can use the customer service interface 130, by inserting the player tracking card into its card reader. The customer service interface 130 communicates with the CMS 140 or PDB 122 as appropriate to obtain, the player's current credit balance. The customer service interface 130 can display the schedule of available comps, as described. The player selects a comp, such as a free meal, and the customer service interface 130 determines if the player has sufficient credits to obtain the selected choice. If so, the customer service interface 130 prints a voucher indicating the selected comp, and sends a message to the CMS 140 or PDB 122 to decrease the player's credit balance by the appropriate amount. Upon redemption of the voucher, for example a $20 voucher at a restaurant, if there is a remaining balance because the cost of the meal was less than $20, then the balance is deposited into the players reward credit balance by converting the dollar amount back to reward credits using the base credit rate.

To further enhance the base and bonus credit system of the present invention, a player tracking program can be adapted to operate in response to the base credit and bonus balances. The player tracking program offers a number of "tiers" or levels of player recognition. The levels are based on a tier score. A player's tier score is the sum of their base reward credits, any manually adjusted base reward credits, and any promotional base reward credits, as accumulated during a calendar year (or other time interval). Manually adjusted reward credits are those added to (or subtracted from) a player's credit balance by a casino employee. Promotion reward credits are those offered by a casino property to the player. A player's tier score may also be adjusted using some multiple of the player's theoretical win. Preferably, periodic (e.g. monthly, daily) reviews of the players' accounts are made to determine the rolling 12 month tier score, and adjust each player's tier. In one embodiment, there are four tiers of players, with corresponding tier scores of <tier 1>, <tier 2>, 3000, and 10,000. The tiers are defined for all of the properties, and applied enterprise wide for all players. The tier levels are made known to the players so that players can actively manage their gaming to achieve a desired tier. Players have access to their tier score through the customer service interfaces 135, the display panels at the gaming machines 185, and over the internet or other network interfaces.

In addition, any property may also set a reward credit earning threshold amount for a particular interval (e.g., one day), such that if the player earns the threshold amount of credits, he is automatically promoted to a specific tier, independent of his actual tier score. For example, a property may set a threshold of 5,000 base reward credits in a day and if the player earns this amount, then he is automatically promoted to the highest tier, even if his 12 month total is below the tier cutoff. This ability of individual properties to establish their own tier upgrades allows the properties to best tailor their comp programs to those customers visiting the property.

Casino employees may also directly issue comps to player upon request, by accessing the CMS 140 via the terminal interface 115. The casino employee can assess a comp issuance screen, and using the player's tracking card, can determine the player's available credit balance. This screen must be viewed by the employee before the employee issues a comp, in order ensure that the player has sufficient credits. In addition, while the player's balance is available to most casino employees, the player's non-bankable comp worth is only displayed on different screen, which requires a second, higher authority password to be viewed, thereby limiting access to such information to only certain employees. Only such higher authority employees are able to issue comps from the non-bank comp score. These employees can issue a comp to a player, even if the comp has a credit cost in excess of the player's credit balance, so long as the player's comp score is greater than the excess amount. After issuance of such a comp, the player's credit balance and comp score are both reduced by the appropriate amount. Authorized employees may also have the ability to issue discretionary comps completely from non-bankable balance, even when player has a reward credit balance available.

I claim:

1. A method of awarding credits to a player in response to the player's gaming activity, wherein the credits can be redeemed for goods and services, the method comprising:

awarding base credits to the player by applying a base credit rate to an amount of the player's betting on a casino game;

awarding bonus credits to the player by applying a bonus credit rate to the player's theoretical win for a gaming period during which the player's betting occurred;

providing to the player a promotional offer including a number of promotional bonus reward credits and identifying a property at which the promotional bonus reward credits can be received; and automatically depositing the number of promotional bonus reward credits into an account of the player in response to a first time the player initiates a gaming session at the identified property.

2. The method of claim 1, wherein the bonus credit rate is based on the player's accumulated theoretical win for a predetermined time interval.

3. The method of claim 1, wherein the bonus credit rate selectively increases as the player's accumulated theoretical win increases during the gaming period.

4. The method of claim 1, wherein the bonus credit rate is based on the player's accumulated theoretical win during a casino day that is different from a calendar day.

5. The method of claim 1, wherein the bonus credit rate is determined based on the property at which the betting occurred, where at least two different properties have different bonus credit rates.

6. The method of claim 1, wherein awarding bonus credits further comprises:

determining a total number of bonus credits as a product of the bonus credit rate and the player's accumulated theoretical win for the gaming period.

7. The method of claim 1, further comprising:

allowing the player to redeem any number of reward credits in the player's account at any property associated with the casino.

8. The method of claim 1, further comprising:

determining whether the player is restricted from gaming; and responsive to the player being restricted from gaming, reducing the number of reward credits in the player's account to zero.

9. The method of claim 1, wherein all reward credits awarded have a predetermined and fixed accounting value that is independent of the property at which the reward credit is earned by the player.

10. The method of claim 1, wherein all reward credits awarded have a predetermined and fixed redeemable cash value that is independent of the property at which the reward credit is earned by the player.

11. The method of claim 1, further comprising: displaying in real time to the player the number of base reward credits earned by the player from the player's betting.

12. The method of claim 1, wherein awarding base reward credits and bonus reward credits further comprises:

posting the base reward credits and the bonus reward credits into the account of the player in response to the player terminating a gaming session.

13. The method of claim 1, further comprising:

displaying to the player in real time a count of a number of coins to be bet for the player to earn an additional base reward credit.

14. The method of claim 1, further comprising:

displaying to the player in real time a count of a number of coins to be bet for the player to earn an additional base reward credit; and a current number of base reward credits earned by the player during a current gaming session.

15. The method of claim 1, further comprising:

displaying, in real time and during a first gaming session by the player at a property, a count of a number of coins to be bet for the player to earn an additional base reward credit; and a current number of base reward credit earned by the player during a current gaming session;

responsive to the player terminating the first gaming session, posting bonus reward credits to an account of the player; and displaying in response to initiation of a second gaming session by the player at the property the number of base reward credits and bonus reward credits awarded to the player during the first gaming session.

16. The method of claim 1, further comprising:

posting to the account of the player during a current trip of the player to a casino property additional comp value based on an average theoretical win of the player over a plurality of visits to one or more properties; and expiring the additional comp value from the player's account if the comps are not redeemed by the player during the current trip.

17. A method of awarding credits to a player in response to the player's gaming activity, wherein the credits can be redeemed for goods and services, the method comprising:

awarding credits to a player in response to the player's gaming activity, wherein the credits can be redeemed for goods and services, the method comprising:

awarding base credits to the player by applying a base credit rate to an amount of the player's betting on a casino game;

awarding bonus credits to the player by applying a bonus credit rate to the player's theoretical win for a gaming period during which the player's betting occurred;

determining a total number of bonus credits as the product of the bonus credit rate and the player's accumulated total theoretical win for the gaming period;

determining a total number of base credits awarded; and awarding bonus credits equal to the difference between the total number of bonus credits and the total number of base credits awarded.

18. The method of claim 1, further comprising:

determining a player's tier score in a player tracking program having a plurality of tiers as a function of accumulated base reward credits.

19. The method of claim 1, further comprising:

allowing an employee of a casino to manually award a number of base reward credits to the player, independently of the player's betting.

20. The method of claim 1, further comprising:

allowing an employee of a casino to manually award a number of base reward credits to the player, independently of the player's betting; and determining the player's tier score in a player tracking program having a plurality of tiers as a function of accumulated base reward credits, including any manually awarded base reward credits.

21. The method of claim 1, wherein the casino game is a table game and the base credit rate is a function of the theoretical win for the table game and a reinvestment rate associated with the theoretical win.

22. The method of claim 1, wherein the casino game is a table game, and the base credit rate is a function of the theoretical win for the table game and a reinvestment rate associated with the theoretical win, and is determined by the property at which the table game is located.

23. The method of claim 1, further comprising:

awarding bonus reward credits to a player as a function of purchases made by the player with a third party.

24. The method of claim 1, further comprising:

storing reward credits in the account of the player; and expiring reward credits in the account if an amount of time since the last reward credit was awarded exceeds a predetermined amount of time.

25. The method of claim 24, wherein expiring the reward credits is limited to base reward credits.

26. The method of claim 24, wherein expiring the reward credits is limited to bonus reward credits.

* * * * *